United States Patent
Ram et al.

(10) Patent No.: US 9,009,196 B2
(45) Date of Patent: Apr. 14, 2015

(54) DISCOVERY AND CLIENT ROUTING TO DATABASE NODES

(75) Inventors: Raghu Ram, Redmond, WA (US); Rohan Samuel Lam, Sammamish, WA (US); Chadwin J. Mumford, Woodinville, WA (US); Peter Gvozdjak, Sammamish, WA (US); David W. Olix, Woodinville, WA (US); Matthew A. Neerincx, Sammamish, WA (US); Junfeng Dong, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 13/181,520

(22) Filed: Jul. 13, 2011

(65) Prior Publication Data
US 2012/0239697 A1    Sep. 20, 2012

Related U.S. Application Data

(60) Provisional application No. 61/453,534, filed on Mar. 16, 2011.

(51) Int. Cl.
*G06F 17/30* (2006.01)

(52) U.S. Cl.
CPC .... *G06F 17/30557* (2013.01); *G06F 17/30578* (2013.01)

(58) Field of Classification Search
CPC .............. G06F 17/30557; G06F 17/30578; G06F 17/30371
USPC ......... 707/781, 782, 821, 823, 825, 786, 705, 707/704, 752, 785, 800, 100, 104
See application file for complete search history.

(56) References Cited

U.S. PATENT DOCUMENTS

| | | | |
|---|---|---|---|
| 7,228,369 B2 * | 6/2007 | Nakamura | 710/38 |
| 7,406,029 B1 | 7/2008 | Ciancaglini et al. | |

(Continued)

OTHER PUBLICATIONS

Boyce, Jim., "TechRepublic Tutorial: Manage clusters with Cluster Administrator", Retrieved at <<http://www.techrepublic.com/article/techrepublic-tutorial-manage-clusters-with-cluster-administrator/1057349>>, Sep. 24, 2001, pp. 4.

(Continued)

*Primary Examiner* — Fred I Ehichioya
*Assistant Examiner* — Dangelino Gortayo
(74) *Attorney, Agent, or Firm* — Kate Drakos; Micky Minhas

(57) ABSTRACT

Aspects of the subject matter described herein relate to database access. In aspects, a request for access to a database is received at a node of a database cluster. Also received at the node is an intent associated with the request. If the intent is to potentially write to the database, a primary instance of the database services the request. If the intent is to read from but not write to the database, an identifier of a secondary instance of the database is sent to the requestor for use in accessing the database.

16 Claims, 6 Drawing Sheets

(56) References Cited

U.S. PATENT DOCUMENTS

| | | | |
|---|---|---|---|
| 7,617,369 B1* | 11/2009 | Bezbaruah et al. | 711/162 |
| 7,672,586 B2 | 3/2010 | Martin | |
| 7,734,947 B1* | 6/2010 | Frangioso et al. | 714/4.1 |
| 7,761,743 B2 | 7/2010 | Talaugon et al. | |
| 7,792,805 B2* | 9/2010 | Shavit et al. | 707/704 |
| 7,949,636 B2* | 5/2011 | Akidau et al. | 707/640 |
| 8,041,735 B1* | 10/2011 | Lacapra et al. | 707/783 |
| 8,255,739 B1* | 8/2012 | Chatterjee et al. | 714/6.1 |
| 8,473,582 B2* | 6/2013 | Ananthanarayanan et al. | 709/218 |
| 8,572,031 B2* | 10/2013 | Merriman et al. | 707/613 |
| 8,635,280 B2* | 1/2014 | Kodama | 709/205 |
| 2005/0138517 A1 | 6/2005 | Monitzer | |
| 2012/0158683 A1* | 6/2012 | Whitehouse | 707/704 |
| 2012/0166390 A1* | 6/2012 | Merriman et al. | 707/613 |

OTHER PUBLICATIONS

"FirePass Controller version 6.0 Administrator Guide: Using FirePass Controllers in Clusters", Retrieved at <<http://support.f5.com/kb/en-us/products/firepass/manuals/product/fp6_0admin/FirePass_6_0_Admin_Guide-13-1.html>>, Retrieved Date: Mar. 21, 2011, pp. 9.

"Load Balancing Considerations", Retrieved at <<http://download.oracle.com/docs/cd/A97335_02/apps.102/a86202/chap12.htm>>, Retrieved Date: Mar. 21, 2011, pp. 6.

* cited by examiner

DISCOVERY AND CLIENT ROUTING TO DATABASE NODES

CROSS REFERENCE TO RELATED APPLICATION

This application claims the benefit of U.S. Provisional Application No. 61/453,534, filed Mar. 16, 2011, entitled DISCOVERY AND CLIENT ROUTING TO DATABASE NODES, which application is incorporated herein in its entirety.

BACKGROUND

A database cluster may include a primary node and a secondary node. If the primary node fails or otherwise becomes inoperative, the secondary node may assume the duties of the primary node. The taking over of the duties is sometimes called failover. Problems may be encountered at failover that may degrade or otherwise affect the performance or accessibility of the database.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to database access. In aspects, a request for access to a database is received at a node of a database cluster. Also received at the node is an intent associated with the request. If the intent is to potentially write to the database, a primary instance of the database services the request. If the intent is to read from but not write to the database, an identifier of a secondary instance of the database is sent to the requestor for use in accessing the database.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. The use of these terms in the claims is not intended to imply an ordering but is rather used for identification purposes. For example, the phrase "first version" and "second version" does not necessarily mean that the first version is the very first version or was created before the second version or even that the first version is requested or operated on before the second versions. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
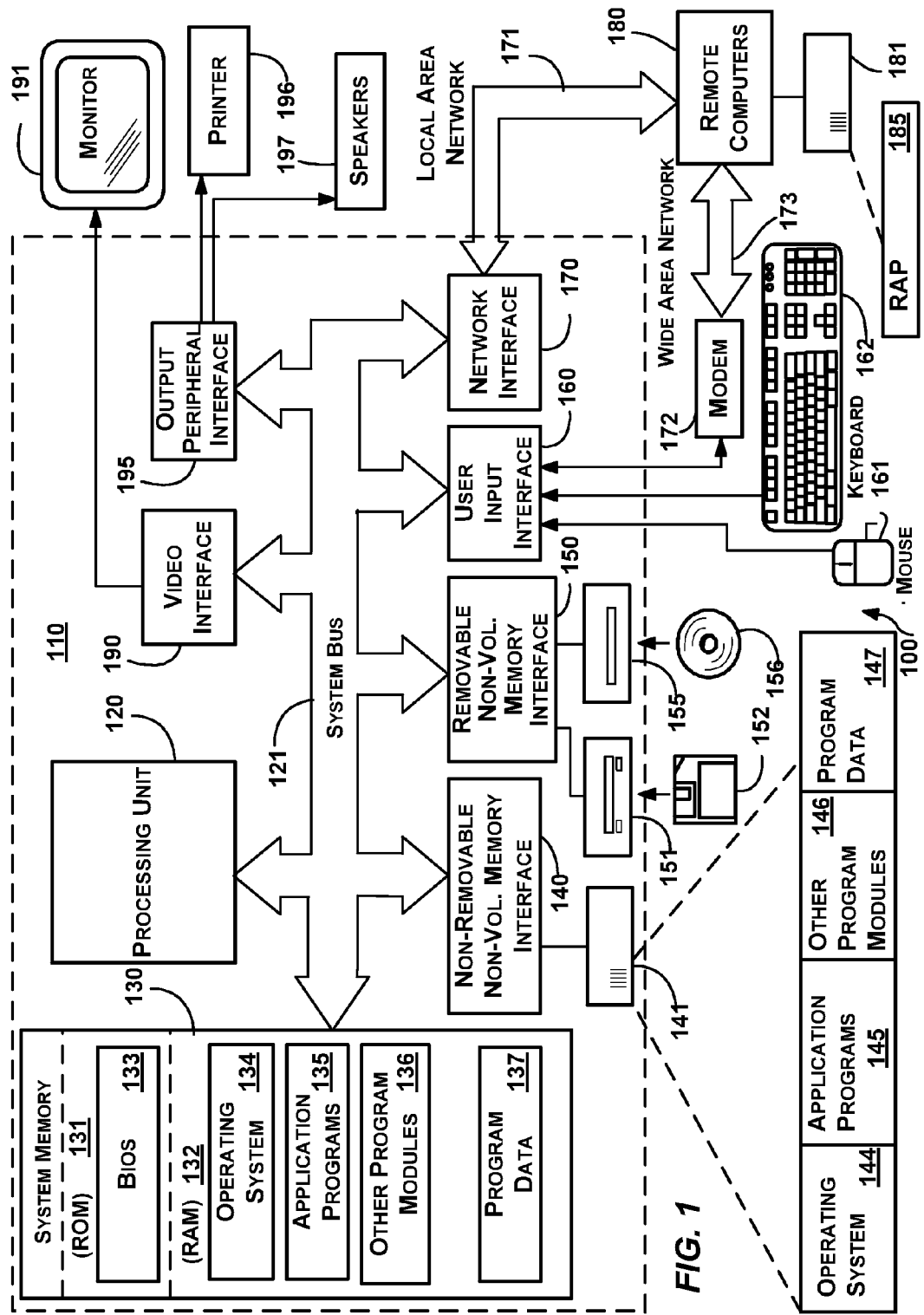
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable non-volatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Discovery and Routing

As mentioned previously, problems may be encountered at failover that may degrade or otherwise affect the performance or accessibility of the database. As used herein, the term "instance of a database" is to be read to include one or more processes that provide access to data of a database. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

Access as used herein may include reading data, writing data, deleting data, updating data, a combination including two or more of the above, and the like.

The term data is to be read broadly to include anything that may be represented by one or more computer storage elements. Logically, data may be represented as a series of 1's and 0's in volatile or nonvolatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include program code, program state, program data, other data, and the like.

As used herein, a database comprises a data store that is capable of storing data in a structured format. A database may comprise a relational database, an object-oriented database, a hierarchical database, a network database, another type of databases, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access.

In describing aspects of the subject matter described herein, for simplicity, terminology associated with a particular type of database may be used. Although database specific terminology may sometimes be used herein, the teachings herein may also be applied to other types of databases including those that have been mentioned previously.

Figure 2:
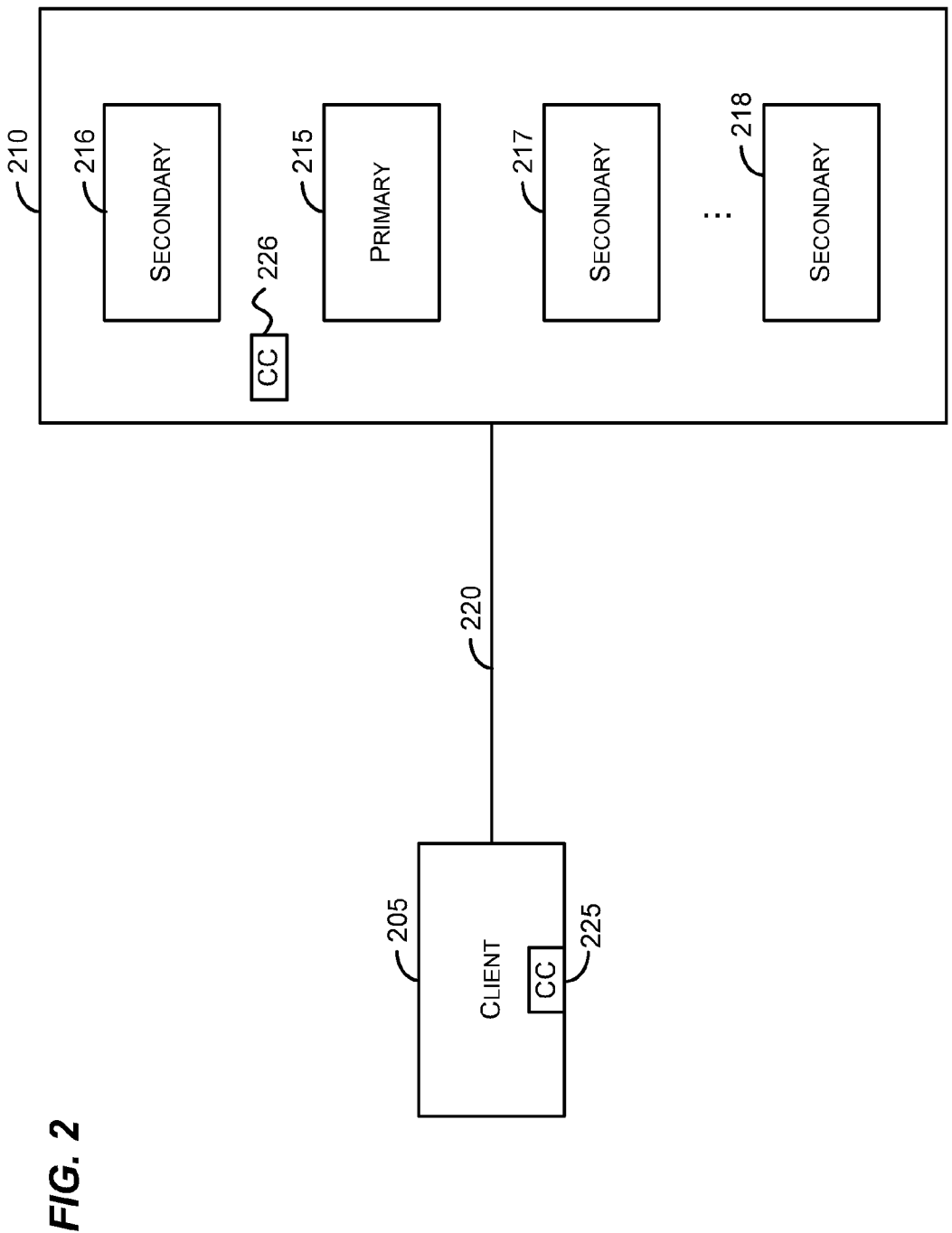
FIG. 2 is a block diagram that represents an exemplary environment in which aspects of the subject matter described herein may be implemented.

FIG. 2 is a block diagram that represents an exemplary environment in which aspects of the subject matter described herein may be implemented. The environment may include a client 205, a cluster 210, and may include other entities (not shown). The cluster 210 may include one or more computers (sometimes referred to as servers or nodes) that host one or more instances of a database. One or more instances may be designated as primary (e.g., the instance 215) while one or more other instances may be designated as secondary (e.g., the instances 216-218).

The various entities may be located relatively close to each other or may be distributed across the world. The various entities may communicate with each other via various networks including intra- and inter-office networks. The client 205 (sometimes referred to herein as a requestor) may communicate with instances of the cluster 210 via the network 220. The client 205 may include communication components 225, which are described in more detail below. Likewise, communication components (e.g., represented by communication components 226) may also be associated with the instances 215-218.

In an embodiment, the network 220 may comprise the Internet. In an embodiment, the network 220 may comprise one or more local area networks, wide area networks, direct connections, virtual connections, private networks, virtual private networks, some combination of the above, and the like.

The client 205 and the server(s) of the cluster 210 may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

The cluster 210 may include one or more servers (sometimes called nodes) that may host instances of one or more databases. Unless the context dictates others, the term "instance" is to be read as "an instance of a database" while the term "instances" is to be read as "two or more instances of a database."

The primary instance 215 may be designated as read/write, while the secondary instances 215-218 may be designated as read-only. While or after data is changed on the primary instance 215, the secondary instances 215-218 may be updated to have the same data as the primary instance 215. In one implementation, clients may be allowed to connect to the secondary instances to obtain data but not to update data.

To obtain a connection to a secondary instance, a client may connect with a connection director of the cluster 210 and specify a read-only intent. The connection director may be part of the communication components 226. The term "connection director" is used to refer to a component that determines the secondary instance for the client. In one embodiment, the connection director to which the client connects may be hosted on the node hosting the primary instance 215. In another embodiment, the client may connect to a connection director that is hosted on a node dedicated to distributing requests to the instances 215-218. In yet another embodiment, the client may connect to a connection director hosted on a node that hosts one or more of the instances 215-218.

In response to a request from the client that indicates read-only intent, the connection director may send a response that includes an identifier (e.g., an IP address, port number, name, combination of the above, or the like) usable to connect with a node hosting a secondary instance. The client may then use this identifier to connect to the secondary instance to obtain data from the database.

In one embodiment, the response may include a single identifier. If the client is unable to connect to the instance associated with the identifier, the client may request another identifier from the connection director.

In another embodiment, the response may include multiple identifiers. These identifiers may be sorted in an order that indicates a preference for the order in which the client is to attempt to connect to the instances associated with the identifiers. In this embodiment, the client may be responsible for finding an available instance using one or more of the identifiers. For example, the client may attempt to connect to instances in the order specified in the response until an instance is found that accepts the client's request. As another example, the client may send parallel requests to one or more of the instances identified by the identifiers and use the instance that first responds.

The response may also include caching data for use in subsequent connection requests to the secondary instance. The caching data may indicate if and potentially a time during which the requestor is allowed to cache the identifier of the secondary instance. For example, the caching data may indicate that the client is not allowed to cache the identifier, that the client is allowed to cache the identifier for a period of time, that the client is allowed to cache the identifier indefinitely, or some other information about caching the identifier. The caching data may indicate a time during which the identifier of the secondary instance is usable for reaching the secondary instance without sending another request to a server hosting the primary instance.

When a client is allowed to cache an identifier, the client may use the identifier to connect to an instance during the period of time without returning to the connection director. If the client is allowed to cache the identifier, after the time has expired, the client is expected to return to the connection director to obtain an identifier (possibly new or the same) for connecting with an instance of the database. If the client is unable to connect with an instance identified by the identifier, the client may flush or mark as invalid the cache entry having the identifier and return to the connection director to obtain another identifier.

To make a determination of the secondary instance for the client to use, the connection director may use a prioritized, hierarchical, or other list that indicates an order of secondary instances to direct a client to for a read only request. The connection director may then use this list together with availability data to provide to the client the identifier of an instance that is available and operational.

For example, the connection director may access availability data that indicates whether secondary instances are available to service a read-only request. If a secondary instance becomes inoperable or otherwise unavailable, the connection director (or another mechanism) may update the availability data to indicate this state. If a secondary instance that was unavailable becomes available, the connection director (or another mechanism) may update the availability data to indicate this state. When a request with read intent is received at the connection director, the connection director may use the list and the availability data to determine an identifier of an instance to send to the client.

When two or more secondary instances are available, the connection directory may use a distribution algorithm to direct client requests to the secondary instances. For example, for an unordered set of N instances, the distribution algorithm may randomly select any available instance (n) to access the data. This distribution algorithm may be used, for example, to balance the load of requests across multiple instances.

The distribution algorithm to apply may be hard-coded, indicated in a configuration file, selected from a list of distribution algorithms determined by some combination of the above, determined in some other way, or the like without departing from the spirit of scope of aspects of the subject matter described herein.

Some exemplary distribution algorithms include in order, round robin, random, other distribution algorithms, and the like. These examples are not intended to be all-inclusive or exhaustive. Indeed, based on the teachings herein, those skilled in the art may recognize many other distribution algorithms that may be used without departing from the spirit or scope of aspects of the subject matter described herein.

For any of a number of reasons, the primary instance 215 may become inoperable, non-responsible, or otherwise fail. Upon detection of this failure, one of the secondary instances 216-218 may take over the duties of the primary instance. The selection of the secondary instance to take over the duties may be performed via a failover algorithm.

In one implementation, for an ordered set of N instances, using a failover algorithm may mean using instance (n) as the new primary instance if and only if instances (0, n−1) are not usable. However, time to establish connections, time to obtain data, availability of instances, and other considerations may also be considered by a failover algorithm.

When a new primary instance is established, this may mean that the node hosting the new primary instance may also host the new connection director. In this case, the new connection director may use its own distribution algorithm and have its own ordering of secondary instances to provide to clients requesting read-only instances. This ordering may be specified by data included on or otherwise associated with the new connection director. Likewise, each secondary instance may be associated with a connection director that has its own ordering data and a distribution algorithm for distributing requests for read-only access in the case that the secondary instance becomes a primary instance. This ordering data and distribution algorithm are sometimes referred to as the criteria a connection director uses for determining secondary instances.

The previous primary instance 215 may again become operable. If the previous primary instance 215 becomes operable, it may also detect or be informed that it is no longer the primary instance. In this case, the previous primary instance 215 may become a secondary instance.

During failover, various actions may occur. For example, client connections to instances (both read/write and read-only) may be dropped, blocked, or otherwise terminated if a new primary instance is selected. In response to detecting that a connection has terminated, a client may again attempt to connect to the connection director of the cluster, which may be hosted on the node hosting the primary instance. In response, the connection director may refer the client to an instance depending on the intent provided by the client.

The intent transmitted in conjunction with a request may also be used to allow or deny the request. For example, if a client attempts to connect with a secondary instance and expresses a read/write intent, the client may be denied the connection. If, however, the client attempts to connect with a primary instance and expresses a read/write intent, the request may be granted.

Likewise, if the client attempts to connect with a secondary instance and expresses a read-only intent, the request may be granted, while if the client attempts to connect with a primary instance and expresses a read-only intent, the request may be accepted (if so configured), denied, or a response indicating a secondary instance to which to connect may be sent.

Those skilled in the art will appreciate that aspects of the subject matter described herein allow a client to use the same connection string regardless of the configuration of instances. For example, in a cluster where there is only one instance (e.g., a primary instance), the client may read data from the instance by sending a connection string that includes the virtual network name of the cluster together with the intent of read-only. In this example, if the cluster is reconfigured to include one or more secondary instances, the client may still send the same connection string to obtain the data. In the reconfigured cluster, the client may receive an indication of a secondary instance from which to obtain the data, but the client does not have to use a different connection string after the cluster has been reconfigured.

Although the environment described above includes a client, network, and a cluster that hosts database instances, it will be recognized that more, fewer, or a different combination of these entities and others may be employed without departing from the spirit or scope of aspects of the subject matter described herein. Furthermore, the entities and communication networks included in the environment may be configured in a variety of ways as will be understood by those skilled in the art without departing from the spirit or scope of aspects of the subject matter described herein.

Figure 3:
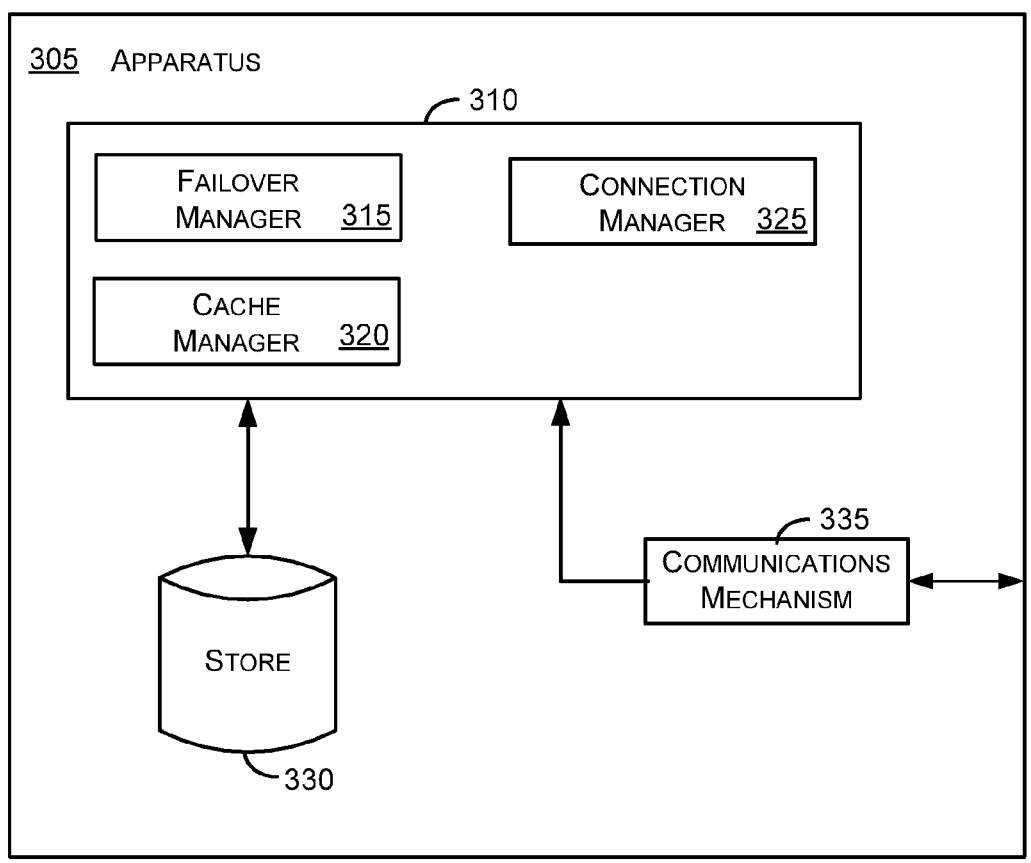
FIG. 3 is a block diagram that represents exemplary components of a client in accordance with aspects of the subject matter described herein.
Figure 4:
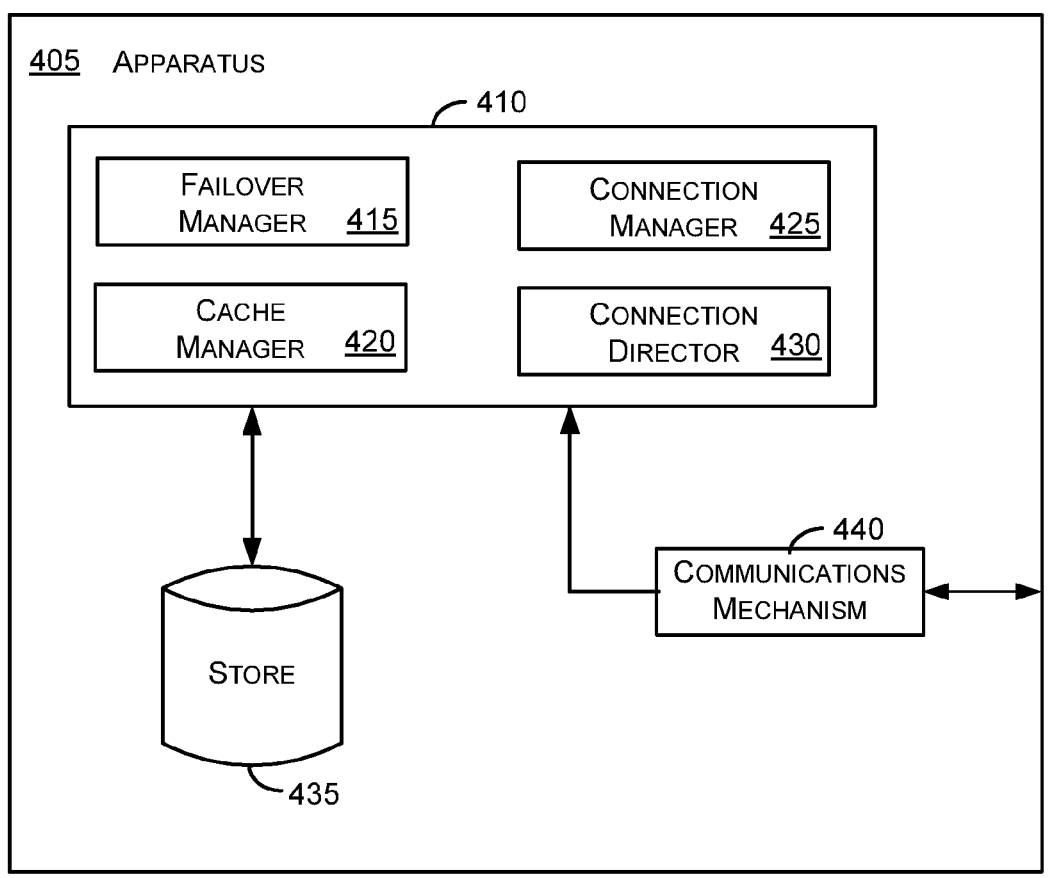
FIG. 4 is a block diagram that represents exemplary components of a server in accordance with aspects of the subject matter described herein.

FIGS. 3-4 are block diagrams that represents apparatuses configured in accordance with aspects of the subject matter described herein. The components illustrated in FIGS. 3-4 are exemplary and are not meant to be all-inclusive of components that may be needed or included. In other embodiments, the components described in conjunction with FIGS. 3-4 may be included in other components (shown or not shown) or placed in subcomponents without departing from the spirit or scope of aspects of the subject matter described herein. In some embodiments, the components and/or functions described in conjunction with FIGS. 3-4 may be distributed across multiple devices.

FIG. 3 is a block diagram that represents exemplary components of a client in accordance with aspects of the subject matter described herein. Turning to FIG. 3, the apparatus 305 may include connection components 310, a store 330, a communications mechanism 335, and other components (not shown). The connection components 310 may include a failover manager 315, a cache manager 320, a connection manager 325, and other components (not shown). As used herein, the term component is to be read to include hardware such as all or a portion of a device, a collection of one or more software modules or portions thereof, some combination of one or more software modules or portions thereof and one or more devices or portions thereof, and the like.

The communications mechanism 335 allows the apparatus 305 to communicate with other entities. For example, the communications mechanism 335 may allow the apparatus 305 to communicate with nodes of the cluster 210 of FIG. 2. The communications mechanism 335 may be a network interface or adapter 170, modem 172, USB or other port, or any other mechanism for establishing communications as described in conjunction with FIG. 1.

The store 330 is any storage media capable of storing data including cache entries that indicate instances with which to connect and time values that indicate how long entries are valid. The store 330 may be implemented with a file system, database, volatile memory such as RAM, other storage, some combination of the above, and the like and may be distributed across multiple devices. The store 330 may be external, internal, or include components that are both internal and external to the apparatus 305.

The connection manager 325 may establish, maintain, and terminate connections between the apparatus 305 and other entities. The connection manager 325 may provide an indication of intent (e.g., read/write, read-only) when establishing a connection. Providing an indication of read/write intent indicates that the client associated with the request seeks to potentially write to the database. The connection manager 325 may include logic for dealing with a response that indicates another entity at which to connect to an instance.

Where caching is enabled, before establishing a connection with an instance, the connection manager 325 may consult the cache manager 320 to determine whether a valid cache entry exists that indicates the instance with which to connect. The connection manager 325 may also detect when a connection has been terminated and, in response, may notify the failover manager 315 of a change in connection state.

The cache manager 320 may create and maintain cache entries. As mentioned previously, a connection director may send a response that includes an identifier of an instance together with caching information including, for example, no caching allowed, a time during which the client may cache the identifier, an indicator that the identifier may be cached indefinitely, and the like. In response, the cache manager 320 may update a cache on the store appropriately. Periodically, the cache manager 320 may delete or mark as invalid entries that have expired.

The failover manager 315 may include logic for determining what to do when a connection to an instance is unexpectedly terminated. This logic may, for example, direct the failover manager 315 to invalidate a cache entry using the cache manager 320. As another example, the failover manager 315 may use this logic to determine that another connection is to be established with a connection director of a cluster. Along these lines, the failover manager 315 may instruct the connection manager 325 to connect to a connection director of the cluster to re-establish a connection to an instance.

FIG. 4 is a block diagram that represents exemplary components of a server in accordance with aspects of the subject matter described herein. Turning to FIG. 4, the apparatus 405 may include connection components 410, a store 435, a communications mechanism 440, and other components (not shown). The connection components 410 may include a failover manager 415, a cache manager 420, a connection manager 425, a connection director 430, and other components (not shown).

The communications mechanism 440 allows the apparatus 405 to communicate with other entities. For example, the communications mechanism 440 may allow the apparatus 405 to communicate with the client 205 as well as other nodes of the cluster 210 of FIG. 2. The communications mechanism 440 may be a network interface or adapter 170, modem 172, USB or other port, or any other mechanism for establishing communications as described in conjunction with FIG. 1.

The store 435 is any storage media capable of storing data and may be implemented in a similar manner to the store 330 of FIG. 3. The store 435 may include data regarding an ordering of instances to which to refer read-only client requests, availability data regarding instances of a cluster, configuration options such as distribution algorithm to use for distributing requests among the instances, other data, and the like. The store 435 may be external, internal, or include components that are both internal and external to the apparatus 405.

The failover manager 415 may include logic to deal with a failover. For example, the failover manager 415 may keep track of health state of the primary instance and may initiate or participate in determining a new primary instance in a failover condition. A failover condition is where the primary instance fails (e.g., becomes inoperative, unreachable, or otherwise unavailable).

The cache manager 420 may provide caching data to client requestors. This caching data may indicate, for example, no caching allowed, a time during which the client may cache the identifier, an indicator that the identifier may be cached indefinitely, and the like. The caching data may be configurable, may vary based on the secondary instance, and may be different depending on the instance that is currently designated as the primary instance.

The connection manager 425 may establish, maintain, and terminate connections with clients and other instances. The connection manager 425 may receive indications of intent (e.g., read/write, read-only) when establishing a connection with a client. This intent may be passed to the connection director 430.

The connection director 430 may be responsible for determining a secondary instance to service a read-only request. The connection director 430 may use an algorithm previously described in determining the secondary instance. The connection director 430 may access a data structure that indicates availability of secondary instances and may take availability into consideration when determining a second instance to which to refer a client.

Figure 5:
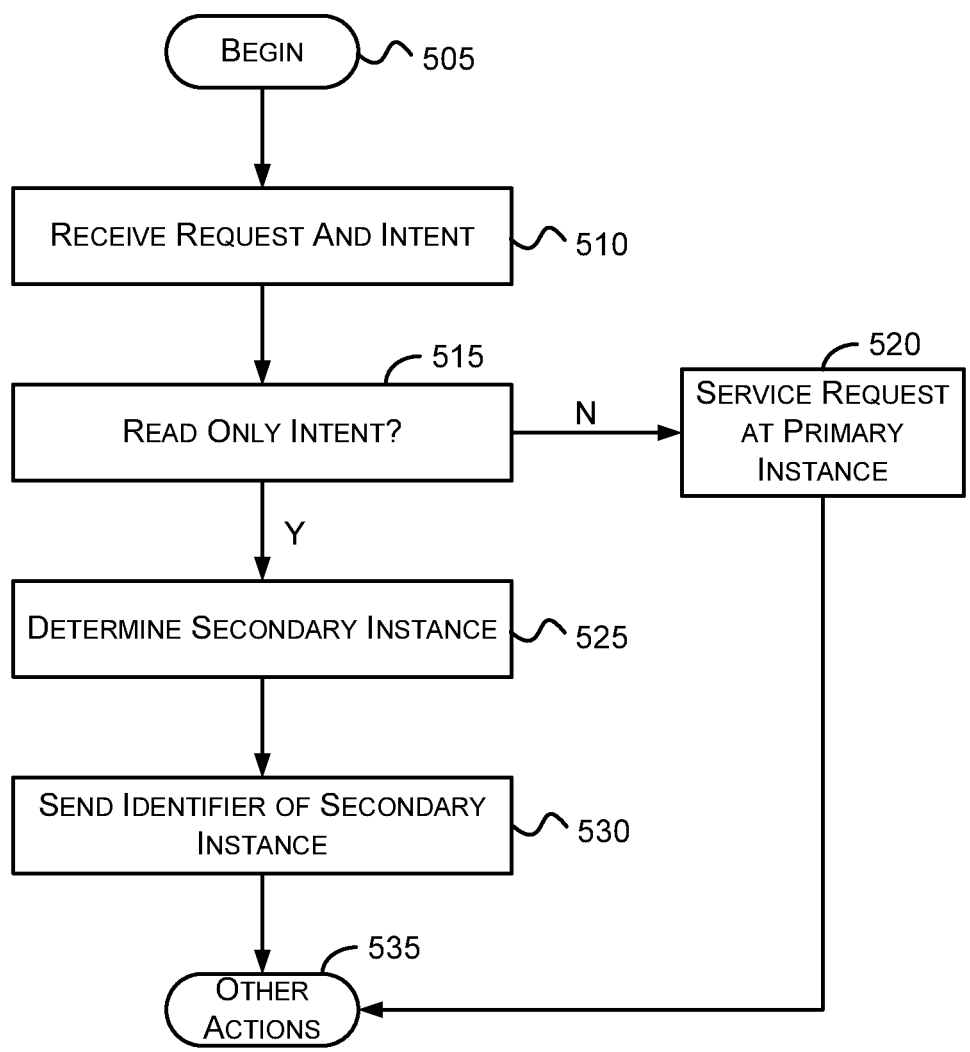
FIG. 5 is a flow diagram that generally represents exemplary actions that may occur in responding to a client request in accordance with aspects of the subject matter described herein.
Figure 6:
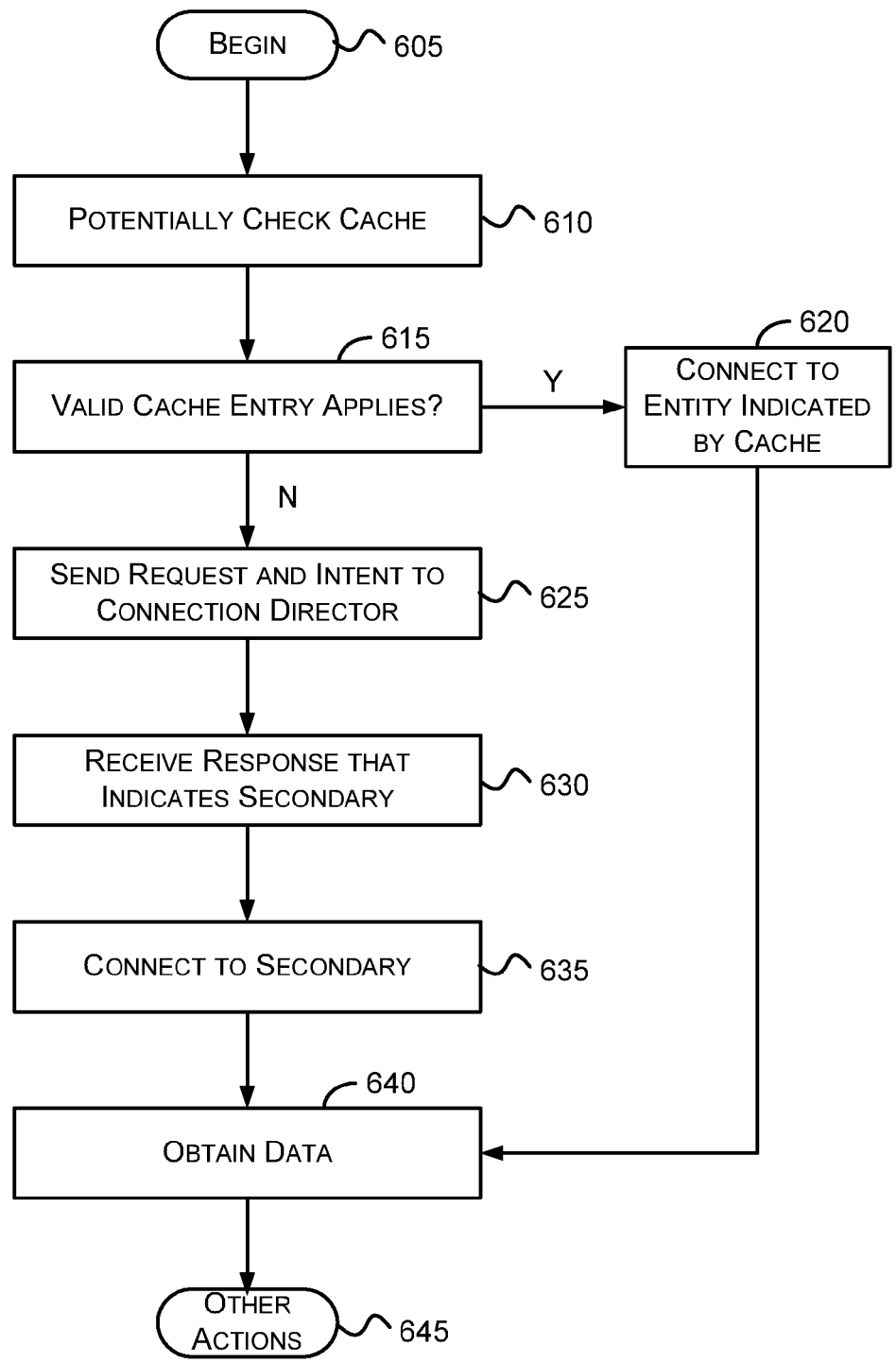
FIG. 6 is a flow diagram that generally represents exemplary actions that may occur in obtaining data from an instance in accordance with aspects of the subject matter described herein.

FIGS. 5-6 are flow diagrams that generally represent exemplary actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that generally represents exemplary actions that may occur in responding to a client request in accordance with aspects of the subject matter described herein. Turning to FIG. 5, at block 505, the actions begin. At block 510, a request and intent are received. The request and intent may be received in a single message or may be delivered in two or more messages.

At block 515, a determination is made as to whether the intent is read-only or not. If the intent is read-only, the actions continue at block 525; otherwise, the actions continue at block 520. Determining whether the intent is read-only or read-write determines whether the primary instance or one of secondary instances are to provide access to the database in response to the request.

If the intent indicates that the requestor seeks to potentially write (e.g., the intent is read/write), access to the database is provided via the primary instance. If the intent indicates that the requestor does not seek to potentially write to the database, a secondary instance to service the requestor is determined via any of the approaches described herein and an identifier of the secondary instance is sent to the requestor. The request may then be allowed to access the database via the secondary instance.

At block 520, the request is serviced at a primary instance. For example, referring to FIG. 2, the primary instance 215 may service the request received from the client 205. Providing access to the database via the primary (or via a secondary) instance may include allowing the requestor to provide credentials to the primary (or secondary) instance prior to obtaining access to the database. If the credentials are valid and permissions on the instance indicate that the requestor is allowed to access the data in the manner requested, the requestor may then access the data.

At block 525, a secondary instance is determined. This determination may involve using an ordered list together with availability data to determine a secondary instance. For example, referring to FIG. 2, if the order list includes, in order, secondary instances 217, 216, and 218, and if instances 216 and 218 are available but instance 217 is not available, a connection director may determine that an identifier to the instance 216 is to be returned to the requesting client.

At block 530, an identifier of the secondary instance is sent to the requesting client. The identifier may be conveyed in conjunction with caching information that indicates if and how long the identifier may be cached. For example, referring to FIG. 2, the connection components 226 may send the identifier of the instance 216 to the client 205 together with caching information that indicates that the identifier may be cached for a period of time.

At block 535, other actions, if any, may be performed.

FIG. 6 is a flow diagram that generally represents exemplary actions that may occur in obtaining data from an instance in accordance with aspects of the subject matter described herein. Turning to FIG. 6, at block 605, the actions begin.

At block 610, a cache may be checked to determine whether there is a valid (e.g., non-expired) cache entry that applies to a data request a client is going to make. For example, referring to FIG. 3, the cache manager 320 may consult a cache on the store 330 to determine whether there is a cache entry that applies to a data request the client is going to make. If the client does not use caching, the actions associated with block 610, 615, and 620 may be skipped.

At block 615, if a valid cache entry applies to the data request, the actions continue at block 620; otherwise, the actions continue at block 625. A cache entry applies if a non-expired cache entry indicates an entity (e.g., secondary instance) from which the client may attempt to obtain the data. For example, referring to FIG. 2, if the cache entry indicates that the client 205 previously obtained data for an application from the secondary instance 217 and the cache entry has not expired, the client 205 may attempt to send its next request for data for the application to the secondary instance 217.

At block 620, the client may attempt to connect to the entity indicated by the cache entry. For example, referring to FIGS. 2 and 3, the connection manager 325 of the client 205 may attempt to connect to the secondary instance 217. If this attempt is unsuccessful, the failover manager 315 may be invoked and the client may follow the actions that start at block 625.

At block 625, the request and intent is sent to a connection director. For example, referring to FIG. 2, the client 205 may send a request to a connection director of the connection components 226. The connection director may be hosted on a node that hosts the primary instance. The client may look up the network address of the connection director via a Domain Name System (DNS) Server, other name server, or the like. In one embodiment, a virtual name is used for the look up.

If the intent is read/write or the cluster is configured to pass read-only requests to the primary instance, the connection director may send the request to the primary instance which may respond directly to the client. In that case, the actions associated with blocks 630-635 and possibly 640 (if the request is an update) may be skipped. Otherwise, if the intent is read-only, the actions continue at block 630.

At block 630, a response is received that indicates (e.g., via an identifier or the like) the secondary instance. For example, referring to FIG. 2, the client 205 may receive a response from the connection director. The response may include an identifier of a secondary instance (e.g., the secondary instance 218) to which the client 205 may connect to obtain the data.

At block 635, the client may then connect with the secondary instance. For example, referring to FIG. 2, the client 205 may connect to the secondary instance 218 using the identifier previously obtained. If caching is enabled, the client may also cache the identifier in accordance with any instructions included in the response and/or caching policy of the client.

At block 640, the data is obtained from the entity to which the client connected. For example, referring to FIG. 2, the client may obtain data from the secondary instance 218.

At block 645, other actions, if any, may be performed.

As can be seen from the foregoing detailed description, aspects have been described related to database access. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
    from a requestor, receiving a request for access to a database, the database being accessible via a primary node of a database cluster and one or more secondary nodes of the database cluster;
    receiving an intent associated with the access, the intent indicating whether the requestor seeks to potentially write to the database;
    based on the intent, determining whether the primary node or one of the secondary nodes are to provide the access to the database in response to the request;
    if the intent indicates that the requestor seeks to potentially write to the database, providing access to the database via the primary node; and
    if the intent indicates that the requestor does not seek to potentially write to the database, in a response to the request, sending an identifier of a secondary node to the requestor via which the requestor is allowed to access the database and, in the response, sending caching data to the requestor that indicates a time period during which the requestor can cache and use the identifier of the secondary node, wherein sending an identifier of a secondary node via which the requestor is allowed to access the database comprises sending the identifier and identifiers of others of the one or more secondary nodes in an ordered list, the ordered list indicating an order in which to attempt to access the database via the one or more secondary nodes, where the order in which to attempt to access the database via the one or more secondary nodes is determined by a failover algorithm utilizing availability data to indicate availability of one or more secondary nodes.

2. The method of claim 1, wherein receiving an intent associated with the access comprises receiving either a read/write intent or a read-only intent.

3. The method of claim 1, wherein receiving a request for access to a database and receiving an intent associated with the access comprises receiving both the request for access and the intent in a single message from the requestor.

4. The method of claim 1, wherein receiving a request for access to a database and receiving an intent associated with the access comprises receiving the request for access and the intent in two or more messages from the requestor.

5. The method of claim 1, wherein providing access to the database via the primary node comprises allowing the requestor to provide credentials to the primary node prior to obtaining access to the database.

6. The method of claim 1, wherein receiving a request for access to a database comprises receiving the request at a server that hosts the primary node.

7. The method of claim 1, further comprising if the intent indicates that the requestor does not seek to potentially write to the database, determining the secondary node via which the requestor is allowed to access the database.

8. In a computing system, a computing device comprising:
    a connection manager operable to establish, maintain, and terminate connections with requestors involved with a database, the database being accessible via a primary node of a database cluster and one or more secondary nodes of the database cluster,
    a connection director operable to receive a request for access to the database, the request originating from a requestor, the connection director further operable to receive an intent associated with the access, the intent indicating whether the requestor seeks to potentially write to the database, the connection director further operable determine a node to service the request based on the intent and, if the intent indicates that the requestor seeks to potentially write to the database, providing access to the database via the primary node, and if the intent indicates that the requestor does not seek to potentially write to the database, in a response to the request, sending an identifier of a secondary node to the requestor via which the requestor is allowed to access the database, and
    a cache manager operable to provide caching data to the requestor, the caching data indicating that the requestor is allowed to cache the identifier and a time period during which the requestor is allowed to cache and use the identifier, wherein sending an identifier of a secondary node via which the requestor is allowed to access the database comprises sending the identifier and identifiers of others of the one or more secondary nodes in an ordered list, the ordered list indicating an order in which to attempt to access the database via the one or more secondary nodes, where the order in which to attempt to access the database via the one or more secondary nodes is determined by a failover algorithm utilizing availability data to indicate availability of one or more secondary nodes.

9. The computing device of claim 8, further comprising, a failover manager operable to participate in determining a new primary node in a failover condition, the new primary node potentially being associated with another connection director that uses other criteria for determining secondary nodes to send to requestors.

10. A system memory having computer-executable instructions, which when executed perform actions, comprising:
- from a requestor, receiving a request for access to a database, the database being accessible via a primary node of a database cluster and one or more secondary nodes of the database cluster;
- receiving an intent associated with the access, the intent indicating whether the requestor seeks to potentially write to the database;
- based on the intent, determining whether the primary node or one of the secondary nodes are to provide the access to the database in response to the request;
- if the intent indicates that the requestor seeks to potentially write to the database, providing access to the database via the primary node; and
- if the intent indicates that the requestor does not seek to potentially write to the database, in a response to the request, sending an identifier of a secondary node to the requestor via which the requestor is allowed to access the database and, in the response, sending caching data to the requestor that indicates a time period during which the requestor can cache and use the identifier of the secondary node, wherein sending an identifier of a secondary node via which the requestor is allowed to access the database comprises sending the identifier and identifiers of others of the one or more secondary nodes in an ordered list, the ordered list indicating an order in which to attempt to access the database via the one or more secondary nodes, where the order in which to attempt to access the database via the one or more secondary nodes is determined by a failover algorithm utilizing availability data to indicate availability of one or more secondary nodes.

11. The system memory of claim 10, wherein receiving an intent associated with the access comprises receiving either a read/write intent or a read-only intent.

12. The system memory of claim 10, wherein receiving a request for access to a database and receiving an intent associated with the access comprises receiving both the request for access and the intent in a single message from the requestor.

13. The system memory of claim 10, wherein receiving a request for access to a database and receiving an intent associated with the access comprises receiving the request for access and the intent in two or more messages from the requestor.

14. The system memory of claim 10, wherein providing access to the database via the primary node comprises allowing the requestor to provide credentials to the primary node prior to obtaining access to the database.

15. The system memory of claim 10, wherein receiving a request for access to a database comprises receiving the request at a server that hosts the primary node.

16. The system memory of claim 10, further comprising if the intent indicates that the requestor does not seek to potentially write to the database, determining the secondary node via which the requestor is allowed to access the database.

* * * * *